United States Patent Office 3,787,575

Patented Jan. 22, 1974

1

3,787,575

N-SUBSTITUTED-2-ARYLIMINO-OXAZOLIDINES USED AS ACARICIDES

Hartmund Wollweber, Rudolf Hiltmann, and Wilhelm Stendel, Wuppertal-Elberfeld, Germany, assignors to Bayer Aktiengesellschaft, Leverkusen, Germany No Drawing. Original application Dec. 17, 1970, Ser. No. 99,227, now Patent No. 3,686,199, dated Aug. 2, 1972. Divided and this application Jan. 24, 1972, Ser. No. 220,419

Int. Cl. A01n 9/22

U.S. Cl. 424—272 8 Claims

ABSTRACT OF THE DISCLOSURE

N-substituted-2-arylimino-oxazolidines of the formula

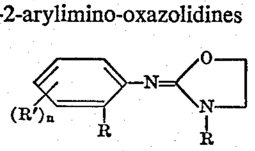

(I)

in which

R denotes a halogen atom, or an optionally halogen-substituted lower alkyl, alkenyl or alkoxy radical, R′ denotes a halogen atom or an alkyl, alkoxy, alkenyl or fluoromethyl radical, R″ denotes an alkyl, alkenyl or alkynyl radical containing up to 7 carbon atoms, the alkenyl radical optionally being substituted at the double bond by 1 or 2 chlorine or bromine atoms, and

*n* denotes 0, 1 or 2, and salts thereof, which possess acaricidal properties.

This is a division of application Ser. No. 99,227, filed Dec. 17, 1970, now Pat. No. 3,686,199, issued Aug. 2, 1973.

The present invention relates to and has for its object the provision of particular new N-substituted-2-arylimino-oxazolidines and salts thereof, i.e. carrying in the 3-position of the oxazolidine an alkyl, alkynyl or alkenyl radical which may be halogen-substituted adjacent the double bond, and the arylimino group comprising a phenylimino radical carrying in the 2-position a halogen or an optionally halo-substituted lower alkyl, alkenyl or alkoxy radical, and the phenyl ring optionally carrying up to 2 halogen, akyl, alkoxy, alkenyl or fluoromethyl radicals, which possess acaricidal properties, active compositions in the form of mixtures of such compounds with solid and liquid dispersible carrier vehicles, and methods for producing such compounds and for using such compounds in a new way especially for combating pests, e.g. acarids, with other and further objects becoming apparent from a study of the within specification and accompanying examples.

N - (2-methyl-4-chlorophenyl)-N′-formamidine is disclosed in South African patent specification 66/4,135 as being effective against ticks but this compound is of little utility because of its instability in cattle dips.

It has now surprisingly been found that the particular N-substituted-2-arylimino-oxazolidines of the formula

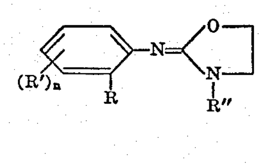

(1)

in which

R denotes a halogen atom, or an optionally halogen-substituted lower alkyl, alkenyl or alkoxy radical, R′ denotes a halogen atom or an alkyl, alkoxy, alkenyl or fluoromethyl radical,

2

R″ denotes an alkyl, alkenyl or alkynyl radical containing up to 7 carbon atoms, the alkenyl radical optionally being substituted at the double bond by 1 or 2 chlorine or bromine atoms, and

*n* denotes 0, 1 or 2, and salts thereof, exhibit strong ectoparasiticidal, especially acaricidal properties, especially against those strains of ticks which show resistance to phosphoric acid esters. The active compounds according to the invention are, moreover, stable when applied in a cattle dip.

Arylimino-oxazolidines which are not substituted in the o-position of the phenyl nucleus and which are known from the literature, such as 2 - (3,4 - dichlorophenyl)-imino - 3-methyloxazolidine (see Table 1 hereinbelow), are ineffective against ticks.

The present invention also provides three processes for the preparation of the N-substituted arylimino-oxazolidines of the Formula I, in one of which (a) A phenylisocyanide dichloride of the general formula

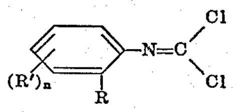

(II)

is reacted with an ethanolamine of the formula $$HO—CH_2—CH_2—NH—R'' \qquad (III)$$

in which R, R′, R″ and *n* possess the meanings stated above, preferably in water or an organic solvent, optionally with the addition of a base, such as triethylamine, sodium carbonate or sodium hydroxide, at 0° to 100° C., or in another of which (b) An urea of the formula

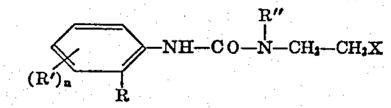

(IV)

in which

R, R′, R″ and *n* have the meanings stated above, and

X denotes an OH or reactive ester group, such as chlorine, bromine, alkylsulfonyl or arylsulfonyl, is cyclized by heating in water, optionally in the presence of a mineral acid such as hydrochloric, hydrobromic or sulfuric acid, and optionally above 100° C. under pressure, or in a third of which (c) A 2-arylimino-oxazolidine (which exists in a tautomeric equilibrium with the appropriate 2-arylamino-oxazolidine) of the formula

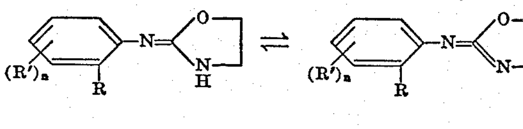

(V)

is reacted with an alkylating, alkynylating or alkenylating agent of the formula $$A—R'' \qquad (VI)$$

in which

R, R′, R″ and *n* possess the meanings stated above, and

A stands for a reactive ester group, such as halogen or arylsulfonyloxy( for example benzenesulfonyloxy or tosyloxy, or alkylsulfonyloxy, for example methanesulfonyloxy.

In many cases, it may be advantageous to add an organic solvent, such as tetrahydrofurane, dioxane or acetone, and/or a dispersing agent. The salts obtained in this way can be converted into the free bases with a base, such as a solution of sodium hydroxide or ammonia.

The above-mentioned ureas of Formula IV serving as starting materials in process variant (b) are obtained according to known processes by reaction of arylisocyanates of the formula

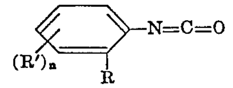

(VII)

with ethanolamines of the formula $$HO—CH_2—CH_2—NH—R'' \quad (III)$$

in which R, R', R'' and *n* possess the meanings stated above, and subsequent action of thionyl halides, such as thionyl chloride, or hydrochloric acid. With this method of working, it is not necessary to isolate the individual intermediates. For example, a start can be made directly from the suitably substituted arylisocyanates and, by successive reaction (a) with ethanolamines of the formula $$HO—CH_2—CH_2—NH—R'' \quad (III)$$

(b) with thionyl chloride and
(c) by heating in water, the desired N-substituted 2-arylamino-oxazolidines are obtained.

The isocyanide dichlorides of Formula II used as starting materials in process variant (a) are obtained, for example, by reaction of substituted anilines with formic acid to give formylanilines, and subsequent action of sulfuryl halides.

As aniline derivatives to be used as starting materials, there are mentioned for example: 2-methyl-6-chloroaniline, 2,6-dichloroaniline, 2,6-dimethylaniline, 2-methyl-6-ethylaniline, 2-methyl-6-allylaniline, 2,4,6-trimethylaniline, 2,4,6-trichloroaniline, 2,6-dichloro-4-methylaniline, 2-trifluoromethylaniline, 2-trifluoromethyl-4-chloroaniline, 2-fluoro-6-chloroaniline, 2-bromo-4-chloroaniline, 4-fluoro-2-chloroaniline, 4-chloro-2-methylaniline, 4-bromo-2-methylaniline, 2,3-dichloroaniline, 2-chloro-3-methylaniline, 2-chloro-3-bromoaniline, 2-methyl-3-chloroaniline, 4-chloro-2-ethylaniline, 2-chloro-4-trifluoromethylaniline, 2-chloro-5-trifluoromethylaniline, 2-chloro-5-difluoromethylaniline, 2,3-dimethylaniline, 2,4-dimethylaniline, 2,5-dimethylaniline, 2-ethylaniline, 2-chloro-6-ethylaniline, 2-chloro-6-propylaniline, 2-chloro-6-butyl-aniline, 2-chloro-6-isobutylaniline, 2-chloro-6-tert.-butylaniline, and the like.

As alkylating alkynylating and alkenylating agents of Formula VI in process variant (c) there are mentioned for example: ethyl bromide, propyl bromide, diethyl sulfate, butyl bromide, isobutyl bromide, allyl chloride, allyl bromide, crotyl bromide, crotyl chloride, pentenyl chloride, propargyl chloride, propargyl bromide, 1-chlorobutyne-(3), 1-chloro-pentyne (3), 1-chloro-hexyne (3), 1,3-dichloropropene, 1,2-dichloropropene, 1,2,3-trichloropropene, 1,3-dichloro-2-methyl-propene-(1), 1,3-dibromopropene, 3-bromo-1-chloropropene, and the like.

The active compounds according to the invention possess a basic character and are, in most cases, distillable oils. They can be applied as free bases or in the form of their salts, for example their hydrochlorides, sulfates, phosphates, nitrates, acetates or naphthalenedisulfonates.

The free bases, like the salts, exhibit strong acaricidal properties, particularly against acarids which, as animal ectoparasites, infest domesticated animals such as cattle and sheep. They are therefore well suited for the control of animal ectoparasites from the Order of the acarids. As ectoparasites of this nature which are economically important, especially in tropical and subtropical countries, there are mentioned for example: the Australian and South American cattle tick, *Boophilus microplus*, and the South African cattle tick, *Boophilus decoloratus*, both from the Family of the Ixodidae.

In the course of time, in various areas the said ticks have become resistant to the phosphoric acid esters and carbamates used hitherto as control agents, so that the success of control there is rendered questionable. To safeguard economic livestock husbandry in the infestation areas, there exists a need for agents with which ticks, even of resistant strains, for example of the genus Boophilus, can be controlled with certainty. For example, in Australia the Ridgeland strain and the Biarra strain of *Boophilus microplus* are, to a great extent, resistant to the phosphoric acid esters and carbmates used hitherto. The active compounds according to the invention are equally effective both against the normally sensitive and the resistant strains, for example, of Boophilus. When applied to the host animal in the usual manner all stages parasitizing on the animal are destroyed directly; besides, the active compounds according to the invention have a strong ovicidal effect on the adult forms so that the reproduction cycle of the ticks is interrupted both in the parasitizing phase. The deposition of eggs is substantially suppressed, development and slipping is inhibited.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, paste, soluble powder, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially agents such as disinfectants, other acaricides, or insecticides, rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–5%, preferably 0.005*3%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, i.e. acarids, and more particularly, methods of combating acarids which comprises applying to (a) such acarids or (b) the corresponding habitat, i.e. the locus to be protected such as the host animal, a correspondingly combative or toxic amount, i.e. a pesticidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like, or by using a bath or dip.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

In-vitro test on ticks for inhibitory effect on egg depositing 3 parts of active compound are mixed with 7 parts of a mixture of equal parts by weight of ethyleneglycol monomethyl ether and nonylphenol polyglycol ether. The emulsion concentrate so obtained is diluted with water to the application concentration desired in each case.

Adult, gorged female ticks of the species *Boophilus microplus* (resistant) are immersed for one minute in this preparation of active compound. After immersion of, in each case, 10 female specimens of the various strains of ticks, the individual ticks are transferred into plastic dishes, the bottom of which is covered with a filter paper disc. After 35 days, the effectiveness of the preparation of active compound is determined by ascertaining the inhibition of the depositing of fertile eggs compared with the egg deposition of untreated control ticks. The effect is stated in percent, 100% meaning that fertile eggs ceased to be deposited, and 0% meaning that the ticks have deposited eggs in normal manner like the untreated control ticks.

The active compounds investigated, the concentrations tried, the parasites tested and the findings can be seen from the following Table 1:

TABLE 1

In-vitro test on ticks for inhibitory effect on egg depositing

| | | Ovicidal effect against *Boophilus microplus* (Biarra strain) | |
|---|---|---|---|
| | | 100% | >50% |
| | Active compound | Inhibition with a concentration of active compound in percent by weight of— | |
| (A) | 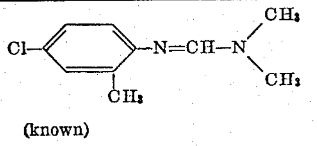 (known) | 0.5 | 0.08 |
| (B) | 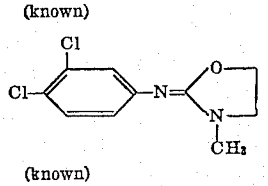 (known) | 1.0<br>No inhibitory effect | 1.0 |
| (1) | 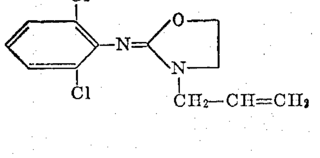 | 0.01 | 0.003 |

TABLE 1—Continued

| Active compound | Ovicidal effect against *Boophilus microplus* (Biarra strain) — Inhibition with a concentration of active compound in percent by weight of— 100% | >50% |
|---|---|---|
| (2) 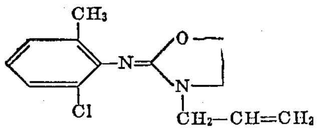 | 0.01 | 0.005 |
| (3) 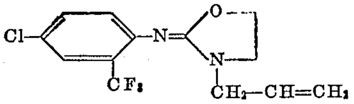 | 0.01 | 0.008 |
| (4) 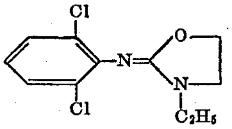 | 0.1 | 0.08 |
| (5) 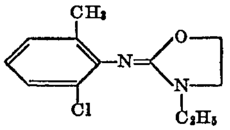 | 0.1 | 0.03 |
| (6) 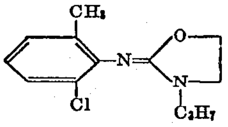 | 0.1 | 0.03 |
| (7) 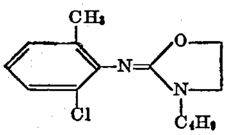 | 0.03 | 0.01 |
| (8) 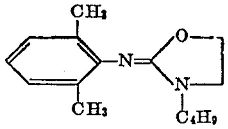 | 0.01 | 0.03 |

The following examples illustrate the preparative process of the invention.

EXAMPLE 2

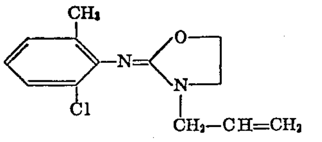

(2)

25.3 g. (0.25 mole) of N-allylethanolamine are added to a solution of 16 g. (0.4 mole) of sodium hydroxide in 75 ml. of water and 75 ml. of dioxane, and 44.5 g. (0.2 mole) of 2-chloro-6-methylisocyanide dichloride in 100 ml. of dioxane are added dropwise. After completion of the exothermic reaction stirring is effected for a further 2 hours at 50° C., the organic phase is separated, the aqueous phase is extracted with ether, and the organic phase is combined with the ethereal solution. After distillation, 44.2 g. of 2-(2-chloro-6-methylphenyl)-imino-3-allyloxazolidine of boiling point 148–150° C./0.1 mm. Hg are obtained.

With corresponding methods of working there are obtained the following imino-oxazolidines set forth in Table 2:

TABLE 2

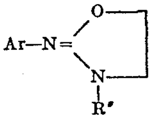

| Ar | R | Compound number | B.P. (° C.)/mm.Hg |
|---|---|---|---|
| 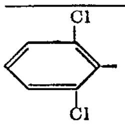 | $CH_2-CH=CH_2$ | (1) | 174/0.3 |

TABLE 2—Continued
| Ar | R | Compound number | B.P. (° C.)/mm.Hg |
|---|---|---|---|
| 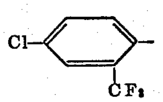 | $CH_2—CH=CH_2$ | (3) | 150/0.1 |
| 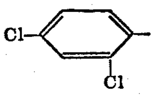 | $CH_2—CH=CH_2$ | (9) | 185/03 |
| 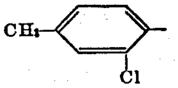 | $CH_2—CH=CH_2$ | (10) | 170/0.3 |
| 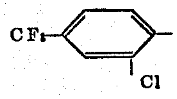 | $CH_2—CH=CH_2$ | (11) | 155/0.1 |
| 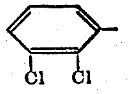 | $CH_2—CH=CH_2$ | (12) | 176/0.3 |
| 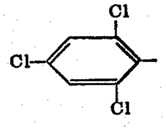 | $CH_2—CH=CH_2$ | (13) | 195/0.2 |
| 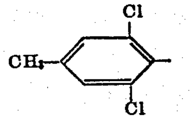 | $CH_2—CH=CH_2$ | (14) | 186/0.2 |
| 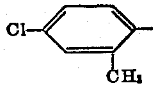 | $CH_2—CH=CH_2$ | (15) | 168/0.1 |
| 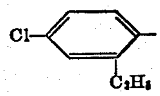 | $CH_2—CH=CH_2$ | (16) | 179/0.1 |
| 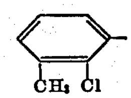 | $CH_2—CH=CH_2$ | (17) | 166/0.2 |
| 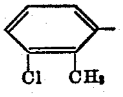 | $CH_2—CH=CH_2$ | (18) | 168/0.2 |
| 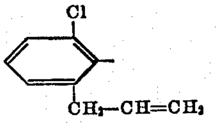 | $CH_2—CH=CH_2$ | (19) | 169/0.1 |
| 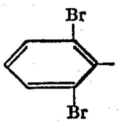 | $CH_2—CH=CH_2$ | (20) | 192/0.1 |
| 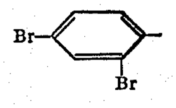 | $CH_2—CH=CH_2$ | (21) | 210/0.1 |
| 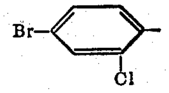 | $CH_2—CH=CH_2$ | (22) | 199/0.2 |
| 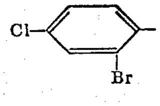 | $CH_2—CH=CH_2$ | (23) | 196/0.2 |

TABLE 2—Continued
| Ar | R | Compound number | B.P. (° C.)/mm.Hg |
|---|---|---|---|
| 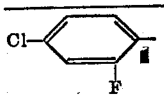 | $CH_2-CH=CH_2$ | (24) | 160/0.1 |
| 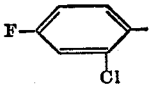 | $CH_2-CH=CH_2$ | (25) | 162/0.1 |
| 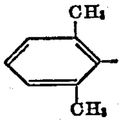 | $CH_2-CH=CH_2$ | (26) | 146/0.1 |
| 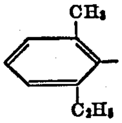 | $CH_2-CH=CH_2$ | (27) | 154/0.1 |
| 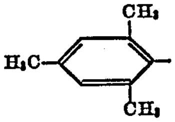 | $CH_2-CH=CH_2$ | (28) | 159/0.1 |
| 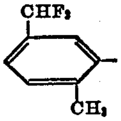 | $CH_2-CH=CH_2$ | (29) | 156/0.1 |
| 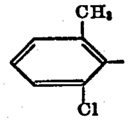 | $CH_2-CH=CH_2$ | (30) | 157/0.1 |
| 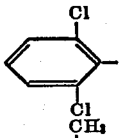 | $CH_2-CH=CH-C_2H_5$ | (31) | 166/0.1 |
| 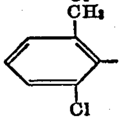 | $CH_2-CH_2-CH=CH_2$ | (32) | 156/0.1 |
| Same as above | 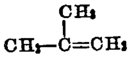 | (33) | 148/0.1 |
| Do | 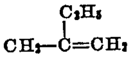 | (34) | 159/0.2 |
| Do | $CH_2-CH=CHCl$ | (35) | 155/0.2 |
| Do | $CH_2-CCl=CH_2$ | (36) | 154/0.2 |
| Do | $CH_2-CCl=CHCl$ | (37) | 169/0.1 |
| Do | $CH_2-CH=CHBr$ | (38) | 163/0.2 |
| 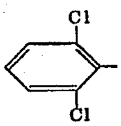 | 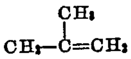 | (39) | 162/0.1 |
| Same as above | $CH_2-CH=CHCl$ | (40) | 168/0.1 |
| Do | $CH_2-CCl=CH_2$ | (41) | 166/0.1 |
| 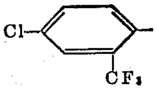 | $CH_2-CH=CH_2$ | (42) | 155/0.1 |
| Same as above | 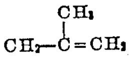 | (43) | 150/0.1 |
| Do | $CH_2-CH=CHCl$ | (44) | 161/0.1 |

TABLE 2—Continued

| Ar | R | Compound number | B.P. (° C.)/ mm.Hg |
|---|---|---|---|
| 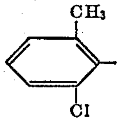 | $C_4H_9$ | (7) | 155/0.1 |
| Same as above | $C_3H_7$ | (6) | 155/0.4 |
| Do | iso-$C_3H_7$ | (45) | 146/0.2 |
| Do | iso-$C_4H_9$ | (46) | 158/0.2 |
| Do | $C_2H_5$ | (5) | 145/0.5 |
| 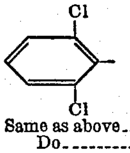 | $C_4H_9$ | (47) | 165/0.1 |
| Same as above | $C_3H_7$ | (48) | 156/0.2 |
| Do | $C_2H_5$ | (4) | 164/0.3 |
| 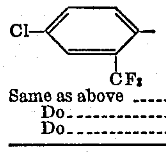 | $C_4H_9$ | (49) | 160/0.3 |
| Same as above | $C_3H_7$ | (50) | 148/0.2 |
| Do | $C_2H_5$ | (51) | 154/0.2 |
| Do | iso-$C_4H_9$ | (52) | 155/0.2 |

EXAMPLE 3

A solution of 33.5 g. (0.2 mole) of 2-chloro-6-methylphenylisocyanate is added dropwise at 0° to 5° C. to a solution of 25.4 g. (0.2 mole) of N-butylethanolamine in 100 ml. of tetrahydrofurane; stirring is afterwards effected for 1 hour at room temperature, followed by evaporation in a vacuum and the residue is taken up in 200 ml. of methylene chloride. 23.8 g. of thionyl chloride are subsequently added dropwise and stirring at 40° C. is then effected until the cessation of evolution of gas, followed by evaporation in a vacuum, and the residue is heated under reflux for 1 hour with 250 ml. of water until the bulk has dissolved. After cooling of the solution, suction filtration from insoluble components is effected and, from the thus obtained solution of 2-(2-chloro-6-methylphenyl)-imino-3-butyloxazolidine hydrochloride, the free base is liberated with ammonia. After taking up in ether and distillation in a vacuum, 2-(2-chloro-6-methylphenyl)imino-3-butyloxazolidine of B.P. 155° C./0.1 mm. Hg is obtained in an amount of 44.3 g.

In a corresponding manner, from 20.2 g. N-allylethanolamine, 33.5 g. of 2-chloro-6-methylphenylisocyanate and 23.8 g. of thionyl chloride, there is obtained 2-(2-chloro-6-methylphenyl)-imino-3-allyloxazolidine hydrochloride, from which, after addition of ammonia, 42.7 g. of free base of B.P. 148–150° C./0.1 mm. Hg are obtained.

EXAMPLE 4

15 g. of potassium carbonate are added to a solution of 21 g. of 2-(2-chloro-6-methylphenyl)-imino-oxazolidine in 250 ml. of methanol; 12.2 g. of allyl bromine are added dropwise, with stirring, and heating under reflux is effected for 10 hours. Concentration is effected in a vacuum, water is added, the reaction product is taken up in ether, and distillation in a vacuum is carried out. 17.3 g. of 2-(2-chloro-6-methylphenyl)-imino-3-allyloxazolidine of B.P. 148–150° C./0.1 mm. Hg are obtained.

With corresponding methods of working, from propargyl bromide and 2-(2-chloro-6-methylphenyl)-imino-oxazolidine there is obtained 2-(2-chloro-6-methylphenyl)-imino-3-propargyloxazolidine, B.P. 146° C./0.1 mm. Hg and from propargyl bromide and 2-(2,6-dichlorophenyl)-imino-oxazolidine there is obtained 2-(2,6-dichlorophenyl)-imino-3-propargyloxazolidine of B.P. 166° C./0.1 mm. Hg.

It will be realized that all of the foregoing compounds contemplated by the present invention possess the desired selective pesticidal, especially acaricidal and ovicidal, properties for combating acarids, and that such compounds have not only a very slight toxicity toward warm-bloded creatures, but also a concomitantly low phytotoxicity.

It will be appreciated that the instant specification and examples are set forth by way of illustration and not limitation, and that various modifications and changes may be made without departing from the spirit and scope of the present invention.

What is claimed is:

1. A method of combating acarids which comprises applying to the acarids or an acarid habitat an acaricidally effective amount of an N-substituted 2 - aryliminooxazolidine of the formula

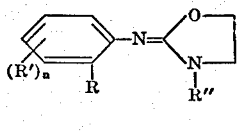

in which

R is chlorine, methyl or trifluoromethyl,
R′ is chlorine or methyl,
R″ is alkenyl of 3 to 7 carbon atoms, the alkenyl radical optionally being substituted at the double bond with 1 or 2 chlorine atoms, and
*n* is 0, 1 or 2, or the hydrochloric, sulfuric, phosphoric, nitric, acetic or naphthalenedisulfonic acid salt thereof, alone or in admixture with a diluent.

2. The method of claim 1 wherein the compound is 2-(2,6-dichlorophenyl)-imino-3-allyloxazolidine of the formula

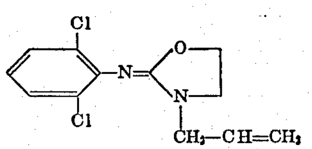

3. The method of claim 1 wherein the compound is 2-(2-chloro-6-methylphenyl)-imino - 3 - allyloxazolidine of the formula

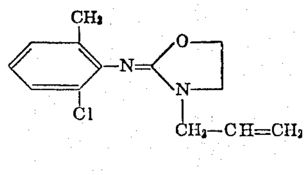

4. The method of claim 1 wherein the compound is 2-(2-trifluoromethyl - 4 - chlorophenyl)-imino-3-allyloxazolidine of the formula

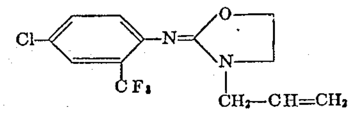

5. An acaricidal composition containing as active ingredient an acaricidally effective amount of an N-substituted 2-aryliminooxazolidine of the formula:

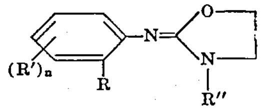

in which
R is chlorine, methyl or trifluoromethyl,
R' is chlorine or methyl,
R'' is alkenyl of 3 to 7 carbon atoms, the alkenyl radical optionally being substituted at the double bond with 1 or 2 chlorine atoms, and
*n* is 0, 1 or 2, or the hydrochloric, sulfuric, phosphoric, nitric, acetic or naphthalenedisulfonic acid salt thereof, in admixture with a diluent.

6. The composition of claim 5 wherein the compound is 2-(2,6-dichlorophenyl)-imino-3-allyloxazolidine.

7. The composition of claim 5 wherein the compound is 2-(2-chloro-6-methylphenyl) - imino-3-allyloxazolidine.

8. The composition of claim 5 wherein the compound is 2-(2-trifluoromethyl-4-chlorophenyl)-imino-3-allyloxazolidine.

References Cited

UNITED STATES PATENTS

| | | | |
|---|---|---|---|
| 3,686,199 | 8/1972 | Wollweber et al. | 260—307 F |
| 2,902,356 | 9/1959 | Luckenbaugh | 71—2.5 |

FOREIGN PATENTS

| | | |
|---|---|---|
| 1,543,534 | 9/1968 | France. |
| 632,578 | 11/1963 | Belgium. |

ALBERT T. MEYERS, Primary Examiner
L. SCHENKMAN, Assistant Examiner